Patented June 26, 1928.

1,674,961

UNITED STATES PATENT OFFICE.

GRANT S. DIAMOND, OF BUFFALO, NEW YORK, ASSIGNOR TO THE ELECTRIC REFRACTORIES CORP., OF BUFFALO, NEW YORK.

REFRACTORY ARTICLE AND MATERIAL AND METHOD OF MAKING THE SAME.

No Drawing. Application filed September 23, 1926. Serial No. 137,383.

This invention relates to a non-recrystallized, refractory material or object, such as may be employed in making crucibles, furnace bricks, tiles, muffles, arches, pedestals, linings, covers, and for various other applications where high temperatures are used. Heretofore most of the refractory compositions, particularly for crucibles, have been formed of graphite and a clay, but the life of such articles has been very short and unsatisfactory, particularly in the iron industry, such as in melting iron or steel. This short life has been largely due to the chemical action which occurs between the clay in the crucible and the metal being treated. The steel or iron dissolves out the silicon in the clay and thus destroys the crucible wall after a short interval of use.

An object of the invention is to provide an improved refractory material which will not require finishing in a recrystallized state.

A further object of the invention is to provide an improved refractory material which is flexible, durable, non-cracking, non-disintegrating, non-oxidizing, relatively inexpensive, and one which will resist the chemical action of metals, fluxes, and slags.

A further object is to provide an improved method of making refractory materials and articles.

Other objects and advantages of the invention will be apparent from the following discussion of the invention.

The basis of the improved refractory material is magnesium oxide. To this oxide I add graphite, preferably in crystalline form. To the graphite and magnesium oxide I also preferably add a suitable binder, and if the binder is a carbonizing binder, I also prefer to use a fusion agent.

In referring to magnesium oxide, I intend to include by that expression burnt or calcined, or fused or sintered magnesite or magnesia, or any other material the principal constituent of which is an oxide of magnesium and this material is preferably in powdered form. Magnesium oxide is particularly valuable as an ingredient of refractory materials, due to its high fusion point, its heat conductivity, low coefficient of thermal expansion, and basic chemical nature.

While any magnesium oxide may be used I prefer to use the fused magnesium oxide. The unfused magnesite when heated while in service will have a normal thermal expansion up to about 2800° F. and then will shrink under continuing or rising heat as it nears the softening point. On the other hand, the fused magnesium oxide does not have the shrinking defect and has normal thermal expansion up to the melting point and is therefore preferable to the unfused magnesite.

The graphite is preferably in the crystalline form which corresponds to the common flake graphite well known in the various industries, and often referred to as Ceylon, Madagascar, etc. The graphite in itself is a good refractory, but in this mixture it has the additional property of producing the elasticity required for a crucible refractory. The graphite in this mixture cannot be considered as a binder since it is intended as a refractory ingredient and a permanent part of the refractory.

Any suitable binder may be used but I have found a carbonizing binder to be very satisfactory. Such a binder may be tar, pitch, molasses, dextrin, natural or synthetic resins, etc. The expression "carbonizing binder" is intended to include any carbonaceous substance which can be obtained in liquid form, and which, when baked, at say from 1000° to 1800° C. under non-oxidizing conditions, leaves a residue of carbon. This carbon bond is superior to any other bond for certain types of refractories. It is desirable, however, in the use of a carbon bond to also add to the mixture a suitable fusion agent or flux, sometimes called a glaze, in order to protect the bond from oxidation in the use of the refractory material. Other binders which may be used are kaolin, aluminous clays, silicate salts, various oxides, such as calcium oxide, or other suitable binding materials.

The glaze or fusion agent should be metallurgically neutral, such as chemically neutral silicate, and should be so selected that its melting point will be proper for the particular conditions under which the crucible or other refractory material or articles is to be used, such as a melting point between 1500° and 3000° F. Ferrous oxide and sodium carbonate may also be used successfully as fusing agents. When magnesium oxide and graphite are used with a carbon binder, it is also desirable to use a fusion agent or glaze in order to protect the carbon from oxidation, and while all the desired amount of the fusion agent may be mixed with the other ingredients before molding and baking, I prefer to mix part of the fusion agent or glaze with the other ingredients prior to baking and then either before or after baking, preferably after, the remainder of the fusion agent or glaze is painted upon the molded refactory object and the latter then rebaked.

The proportions of the different ingredients may be varied to some extent, but the following examples will serve as an indication of the proportions which have been found very satisfactory:

*Example I.*

|  | Per cent. |
|---|---|
| Magnesium oxide | 40 to 60 |
| Crystalline graphite | 20 to 40 |
| A binder | 0 to 20 |

*Example II.*

|  | Per cent. |
|---|---|
| Magnesium oxide | 50 |
| Graphite | 20 |
| Fusion agent | 12 |
| Tar | 18 |

The proportions may also be varied somewhat in accordance with the different uses to which the material or article is to be put. For example, for some refractory shapes it will be necessary to have more flexibility than others and this may be accomplished by varying the proportion of the graphite. The range of variations may be even 10 per cent or more.

After the desired proportions have been decided upon, the various dry ingredients may be thoroughly mixed dry, the liquid binder added and mixed therewith, the whole then allowed to age for a suitable period, after which the mixture may be pressed, molded, spun, or otherwise formed into the desired shape and size, and then baked at a temperature of approximately 1000° C. The articles, after baking, may be placed in use.

The refractory material embodying this invention is purely a non-recrystallized refractory in view of the fact that the finished article is not a homogeneous, monolithic mass produced by recrystallizing the ingredients at their sublimation temperatures. This non-recrystallized finish is important since it eliminates the very costly and difficult temperatures commonly used in making refractories such as magnesia and alundum.

It will be obvious that various changes in the details, which have been herein described in order to explain the nature of the invention, may be made by those skilled in the art within the principle and scope of the invention as expressed in the appended claims.

I claim:—

1. A refractory material comprising a non-recrystallized mixture of fused magnesium oxide and a carbon binder, with a protecting surface glaze.

2. A refractory material comprising a non-recrystallized mixture of fused magnesium oxide, crystalline graphite, a binder, with a protecting surface glaze.

3. A refractory material comprising a non-recrystallized mixture of magnesium oxide, a carbon binder, and a fusion agent, which has been heated to a temperature sufficient to convert the fusion agent into a surface glaze and less than approximately 1000° C.

4. A refractory material comprising a non-recrystallized mixture of magnesium oxide, crystalline graphite, a carbon binder, and a fusion agent.

5. A refractory material containing magnesium oxide, crystalline graphite, and a binder.

6. A refractory material comprising magnesium oxide, crystalline graphite, and a carbon binder.

7. A refractory material comprising magnesium oxide, crystalline graphite, a carbon binder, and a fusion agent.

8. A refractory material containing fused magnesium oxide, crystalline graphite, and a binder.

9. A refractory material comprising fused magnesium oxide, crystalline graphite, and a carbon binder.

10. A refractory material comprising magnesium oxide, crystalline graphite, a carbon binder, and a fusion agent of a silicate salt.

11. A refractory material comprising magnesium oxide, crystalline graphite, a binder, and a fusion agent.

12. A refractory material comprising a non-recrystallized mixture of magnesium oxide and crystalline graphite.

13. A refractory article comprising a mixture of magnesium oxide, graphite, a carbon binder and a fusion agent, which mixture has been heated to approximately 1000° C. without recrystallization and without material oxidation of the binder.

14. A non-recrystallized refractory object containing magnesium oxide, and crystalline graphite.

15. A non-recrystallized refractory object containing magnesium oxide, crystalline graphite, a carbon binder, and a protecting surface glaze.

16. The method of making refractory articles which comprises mixing an oxide of magnesium and crystalline graphite with a liquid binder, forming the mixture into the desired articles, and baking the articles at a temperature of approximately 1000° C.

17. The method of making refractory articles which comprises mixing an oxide of magnesium and crystalline graphite with a liquid binder, ageing the mixture for a suitable period, forming the mixture into the desired articles, and baking the articles at a temperature of approximately 1000° C.

18. The method of making refractory articles which comprises mixing together an oxide of magnesium, crystalline graphite, a fluid carbon binder, and a fusion agent, forming the mixture into the desired articles, and baking the latter at a temperature of approximately 1000° C.

19. A non-recrystallized, refractory material containing in approximate amounts from 40 to 60 percent magnesium oxide, 20 to 40 percent graphite, and a binder.

20. A non-recrystallized, refractory object containing in approximate percentages 50 percent magnesium oxide, 20 percent of graphite, 12 percent of fusion agent, and 18 percent of tar.

21. A non-recrystallized, refractory material containing in approximate amounts from 40 to 60 percent magnesium oxide, 20 to 40 percent crystalline graphite, and a binder.

22. A non-recrystallized, refractory material containing in approximate amounts from 40 to 60 percent magnesium oxide, 20 to 40 percent crystalline graphite, and 20 percent binder.

23. A non-recrystallized, refractory material containing in approximate amounts from 40 to 60 percent magnesium oxide, 20 to 40 percent crystalline graphite, and a carbon binder up to 20 percent.

24. A non-recrystallized, refractory material containing in approximate amounts from 40 to 60 percent magnesium oxide, 20 to 40 percent crystalline graphite, a carbon binder up to 20 percent, and a suitable fusion agent.

25. An improved refractory article containing a mixture of magnesium oxide, graphite, and a carbon binder, the magnesium oxide comprises from 40 to 60 percent of the total mixture, and the mixture having been heated to approximately 1000° C. without recrystallization and without material oxidation of the binder.

26. The method of making refractory articles which comprises mixing an oxide of magnesium and crystalline graphite with a carbon binder and a quantity of a glaze, forming the mixture into the articles desired, baking the articles, and applying a coating of further glaze to the articles after they have been formed from the mixtures.

27. The method of making refractory articles which comprises mixing an oxide of magnesium and crystalline graphite with a carbon binder and a quantity of a glaze, forming the mixture into the articles desired, baking the articles, applying to the baked articles a coating of a further quantity of the glaze, and then rebaking them.

28. A crucible having incorporated in its wall along its inner surface a mixture of fused magnesium oxide, crystalline graphite, a carbon binder and a protecting surface glaze.

GRANT S. DIAMOND.